United States Patent
Yamada et al.

(10) Patent No.: US 7,267,350 B2
(45) Date of Patent: Sep. 11, 2007

(54) STEERING DAMPER

(75) Inventors: Shinichi Yamada, Wako (JP); Takeshi Wakabayashi, Wako (JP); Takehiko Nanri, Wako (JP); Kiyotaka Sakai, Wako (JP)

(73) Assignees: Honda Motor Co., Ltd, Minato-ku (JP); Kayaba Industry Co., Ltd., Minato-ku (JP)

( * ) Notice: Subject to any disclaimer, the term of this patent is extended or adjusted under 35 U.S.C. 154(b) by 95 days.

(21) Appl. No.: 10/853,847

(22) Filed: May 25, 2004

(65) Prior Publication Data

US 2004/0239069 A1     Dec. 2, 2004

(30) Foreign Application Priority Data

May 28, 2003   (JP)  ............................ 2003-151263

(51) Int. Cl.
*B62K 21/08* (2006.01)
(52) U.S. Cl. .................... 280/272; 280/448; 280/441.2
(58) Field of Classification Search ................ 280/272, 280/448, 441.2
See application file for complete search history.

(56) References Cited

U.S. PATENT DOCUMENTS 3,907,079 A   9/1975   Chapman
5,586,780 A   12/1996   Klein et al.
5,944,152 A   8/1999   Lindsay et al.
2003/0047904 A1*   3/2003   Hasegawa et al. .......... 280/272
2003/0146594 A1*   8/2003   Bunya et al. ................ 280/272
2004/0046351 A1*   3/2004   Morgan et al. ............. 280/272

FOREIGN PATENT DOCUMENTS

| EP | 1 248 013 | 10/2002 |
|---|---|---|
| EP | 1 323 625 | 7/2003 |
| EP | 1 459 971 | 9/2004 |
| JP | 7-74023 | 8/1995 |

* cited by examiner

*Primary Examiner*—Lesley D. Morris
*Assistant Examiner*—Marlon Arce-Diaz
(74) *Attorney, Agent, or Firm*—Hamre, Schumann, Mueller & Larson, P.C.

(57) ABSTRACT

A steering damper includes a steering damper body installed in a steering system of a vehicle, and having a fluid path therein, and a pressure control valve for controlling a damping force in the steering system, and provided in the fluid path, wherein the pressure control valve controls the damping force so that an increasing rate of the damping force with respect to a steering angular velocity when the steering angular velocity is large is lower than that when the steering angular velocity is small.

6 Claims, 12 Drawing Sheets

STEERING DAMPER

BACKGROUND OF THE INVENTION

1. Field of the Invention

The present invention relates to a steering damper.

Priority is claimed on Japanese Patent Application No. 2003-151263, filed May 28, 2003, the content of which is incorporated herein by reference.

2. Description of the Related Art

As a steering damper included in steering systems of vehicles such as conventional motorcycles, a type of steering damper is known, which controls damping force generated in the steering system by controlling a pressure control valve provided in a fluid path of a steering damper body so as to change damping force generated by the pressure control valve (for example, refer to Japanese Examined Patent Application, Second Publication No. H7-74023).

The conventional steering damper mentioned above has problems described below.

In the conventional steering damper, a load applied to a front wheel of a vehicle is measured, and electrical current supplied to a solenoid that is installed in a pressure control valve is controlled so as to increase a damping force when the load is decreased. Because the relationship between a steering angular velocity and the damping force of the steering system is set to be basically linear, when the steering damper is configured so that an operation force at the steering handle at the beginning of a steering operation is set to be low, the vibrations due to road surface disturbances in a low steering angular velocity region during high speed driving cannot be absorbed. In contrast, when the steering damper is configured so as to absorb the vibrations due to road surface disturbances in a low steering angular velocity region during high speed driving, the operation force at the steering handle at the beginning of a steering operation becomes high.

In other words, in the conventional steering damper, it is not possible to simultaneously achieve two objects, i.e., one is to set the operation force at the steering handle at the beginning of a steering operation to be low, and the other is to absorb the vibrations due to road surface disturbances in a low steering angular velocity region during high speed driving.

SUMMARY OF THE INVENTION

The present invention was made in view of the above circumferences, and an object thereof is to provide a steering damper which simultaneously achieves two objects of setting the operation force at the steering handle at the beginning of a steering operation to be low, and of absorbing the vibrations due to road surface disturbances in a low steering angular velocity region during high speed driving.

In order to achieve the above object, the present invention provides a steering damper including: a steering damper body installed in a steering system of a vehicle, and having a fluid path therein; and a pressure control valve for controlling a damping force in the steering system, and provided in the fluid path, wherein the pressure control valve controls the damping force so that an increasing rate of the damping force with respect to a steering angular velocity when the steering angular velocity is large is lower than that when the steering angular velocity is small.

In the above steering damper, the pressure control valve may control the damping force so that the increasing rate of the damping force with respect to the steering angular velocity when the steering angular velocity is larger than a predetermined value is lower than that when the steering angular velocity is smaller than or equal to the predetermined value.

In the above steering damper, the steering damper body may include a fluid chamber having an entrance and an exit, a first fluid path connected to the entrance of the fluid chamber, a second fluid path connected to the exit of the fluid chamber, and a connection fluid path connecting the first fluid path to the second fluid path. The pressure control valve may be a relief valve provided in the connection fluid path.

The present invention further provides a steering damper including: a steering damper body installed in a steering system of a vehicle, and having a fluid path therein; and a pressure control valve for controlling a damping force in the steering system, and provided in the fluid path, wherein the pressure control valve controls the damping force so that an increasing rate of the damping force with respect to a steering angular velocity when the damping force is large is lower than that when the damping force is small.

In the above steering damper, the pressure control valve may control the damping force so that the increasing rate of the damping force with respect to the steering angular velocity when the damping force is larger than a predetermined value is lower than that when the damping force is smaller than or equal to the predetermined value.

According to the present invention, the relationship between the steering angular velocity and the damping force of the steering system is not linear over the entire steering angular velocity region, and the steering damper is configured so that the increasing rate of the damping force with respect to the steering angular velocity of the steering system when the steering angular velocity is large is lower than that when the steering angular velocity is small, or the increasing rate of the damping force when the damping force is large is lower than that when the damping force is small; therefore, the damping force can be quickly increased as the steering angular velocity is increased from a state in which the steering angular velocity is small and the damping force is low. Accordingly, the two objects of setting the operation force at the steering handle at the beginning of a steering operation to be low, and of absorbing the vibrations due to road surface disturbances in a low steering angular velocity region during high speed driving can be simultaneously achieved. In addition, because the increasing rate of the damping force is maintained to be low for higher steering angular velocity, the damping force will not exceed a predetermined value.

BRIEF DESCRIPTION OF THE DRAWINGS

FIG. 4A is a plan view, FIG. 4B is a side view, and FIG. 4C is a cross-sectional view taken along the line A-A in FIG. 4A;

FIG. 5A is a plan view, and FIG. 5B is a cross-sectional view taken along the line B-B in FIG. 5A;

DETAILED DESCRIPTION OF THE PREFERRED EMBODIMENTS

A motorcycle equipped with a steering damper according to the present invention will be explained below with reference to the appended drawings. In the following description, the denotations of the back and front, and right and left directions are defined based on the motorcycle body.

Figure 1:
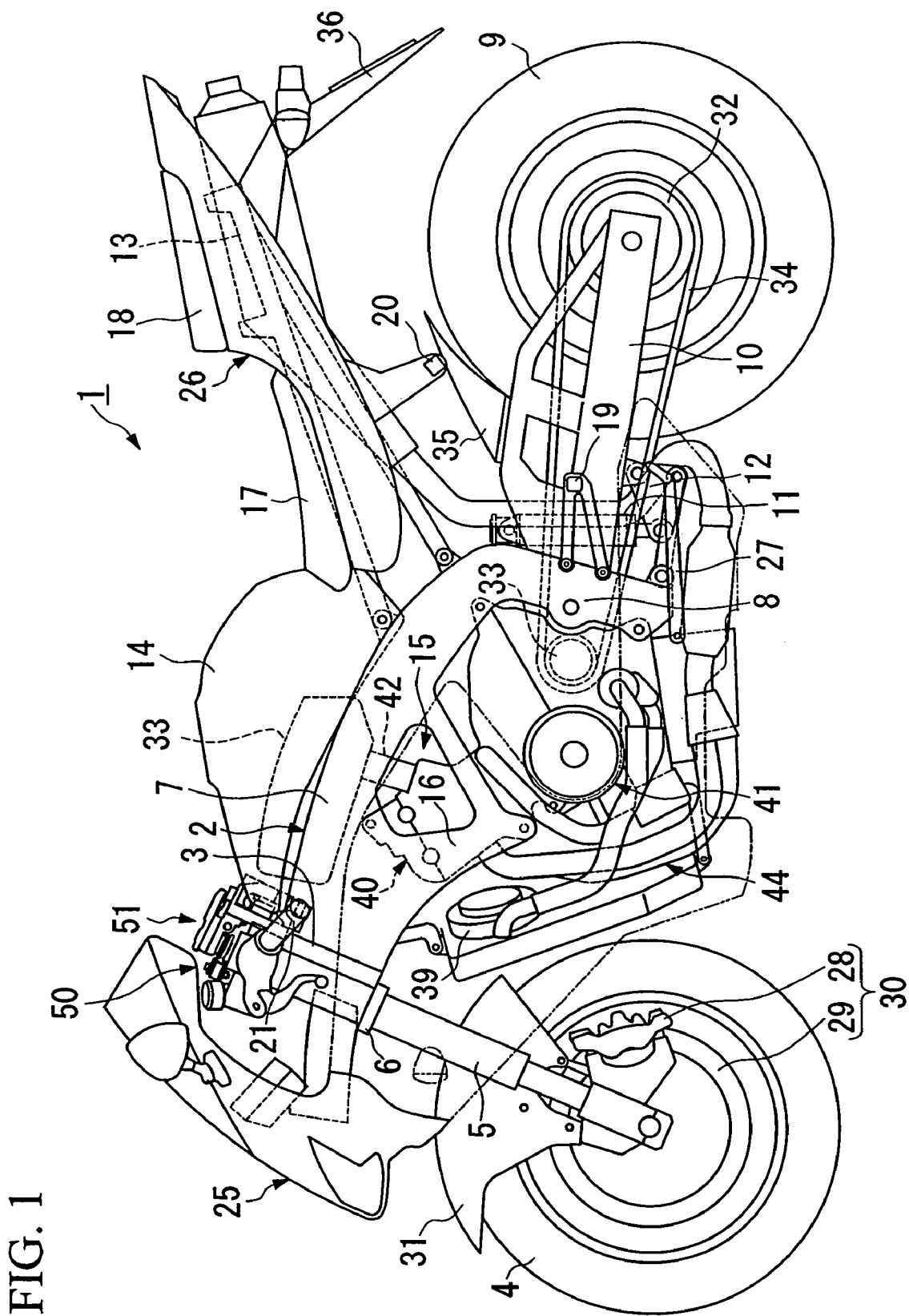
FIG. 1 is a side view of a motorcycle showing an embodiment of the present invention.

As shown in FIG. 1, a motorcycle 1 is provided with a motorcycle body frame 2 in the approximate center, and a front fork 5 which supports a front wheel 4 is steerably supported through a steering stem 6 by a head pipe 3 which is provided in the front end of a motorcycle body frame 2. A main frame 7 is provided from the head pipe 3 of the motorcycle body frame 2 so as to extend obliquely behind and downward after being separated to the right and left, and to extend downwardly through bends. Pivot sections 8 are provided in the approximately central front end sections of the parts of the main frame 7 extending downward, and rear forks 10 supporting a rear wheel 9 are supported rockably by the pivot sections 8. In addition, slightly rear sections of the parts supported by the pivot sections 8 of the rear forks 10 are joined to the main frame 7 through rear cushions 11 and link sections 12.

A seat frame 13 is joined to rear sections of the main frame 7. A fuel tank 14 is arranged above the main frame 7, and an engine body 15 of a water-cooled parallel four-cylinder engine is arranged below the main frame 7. From the front part of the main frame 7, engine hangers 16 are extended downwardly, and the engine hangers 16 support the engine body 15 with other junctions for basic engine support which are provided in the main frame 7.

Behind the fuel tank 14, a rider's seat 17 and a passenger seat 18 are respectively supported by a seat frame 13. In addition, rider's steps 19 are attached in the rear sections of the pivot sections 8 of the motorcycle body frame 2, and co-rider's steps 20 are attached in the lower portion of the seat frame 13. Furthermore, a pair of right and left handles 21 and 21 is attached to the top end of the front fork 5 through a top bridge 49.

A front nose section of the motorcycle 1 is covered with a front cowl 25, and the vicinity of the seat frame 13 is covered by a rear cowl 26. In addition, a retractable prop stand 27 is arranged in a lower left side of the motorcycle body frame 2, the prop stand 27 which supports the motorcycle body of the motorcycle 1 in a rising state oblique to a left side.

A front brake device 30 is constituted by a brake caliper 28 being attached to a bottom end section of the front fork 5 and a brake rotor 29, corresponding to the brake caliper 28, being attached to a front wheel 4. In addition, a front fender 31 covering over the front wheel 4 is attached to a bottom end section of the front fork 5.

A rear sprocket 32 is attached to a left side of a rear wheel 9 so as to rotate with the rear wheel 9 integrally. A drive chain 34 is looped over the rear sprocket 32 and a drive sprocket 33 arranged in a lower left side of the engine body 15. Then, a driving force of the engine body 15 is transmitted to the rear wheel 9. A front rear fender 35 covering over an upper front side of the rear fork 10 is attached to an upper portion of the rear wheel 9, and a rear fender 36 covering over an upper rear side of the rear wheel 9 is attached to a lower portion of the rear cowl 26. In addition, a rear brake device which has the same structure as the front brake device 30 of the front wheel 4 is provided in the rear frame 10.

A cylinder body 40 of the engine body 15 is arranged so as to slightly incline forward over a crankcase 41. Throttle bodies 42 corresponding to respective cylinders are joined to rear sections of the cylinder body 40, and respective throttle bodies 42 are joined to an air cleaner case 43 located between the main frame 7 and fuel tank 14. In addition, exhaust pipes 44 corresponding to respective cylinders are joined to front parts of the cylinder body 40. The exhaust pipes 44 extend forward from a front wall 45 of the cylinder body 40, are curved and extend downwardly, extend in front of and under the crankcase 41, and extend to a location behind the engine body 15.

The above-mentioned steering stem 6, a top bridge 49 located above a bottom bridge of the steering stem 6 in parallel to the bottom bridge, the steering handle 21, and the like constitute the steering system 50 which steers the front wheel 4. The steering system 50 is provided with the steering damper 51 (refer to FIGS. 2 and 3).

The steering damper 51 is for decreasing the vibration of the steering handle 21 which is caused by a kickback, etc., or absorbing vibration in a low steering angular velocity region which is caused by road surface disturbances during high speed driving. In general, two types of steering dampers are known, one is a rod type and the other is a rotary type, and a rotary type steering damper 51, which is suitable for reducing the size thereof, is used in this embodiment.

Figure 2:
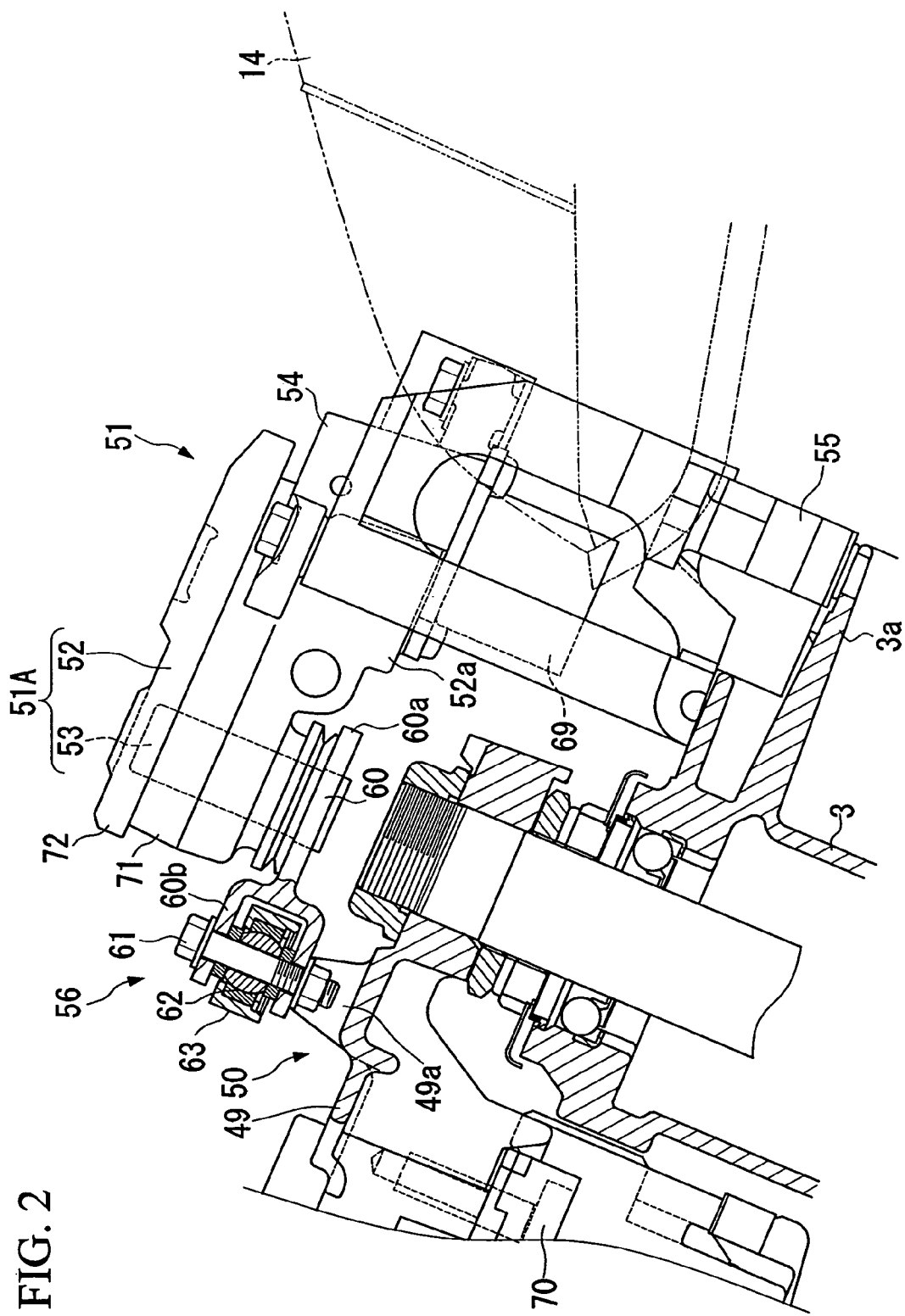
FIG. 2 is a partially sectioned side view showing the mounting structure of a steering damper in the motorcycle.

As shown in FIG. 2, the steering damper 51 includes a steering damper main body 51A being constituted by a housing 52 and a shaft 53 which penetrates a bottom face section of the housing 52 and protruding outside, and a pressure control valve 68 (See FIG. 10) intermediately installed in the fluid path of the steering damper main body 51A. The housing 52 is attached to a junction 3a provided with the head pipe 3 through first and second brackets 54 and 55. On the other hand, the shaft 53 is attached to the top bridge 49 through a link mechanism 56.

Figure 4A:
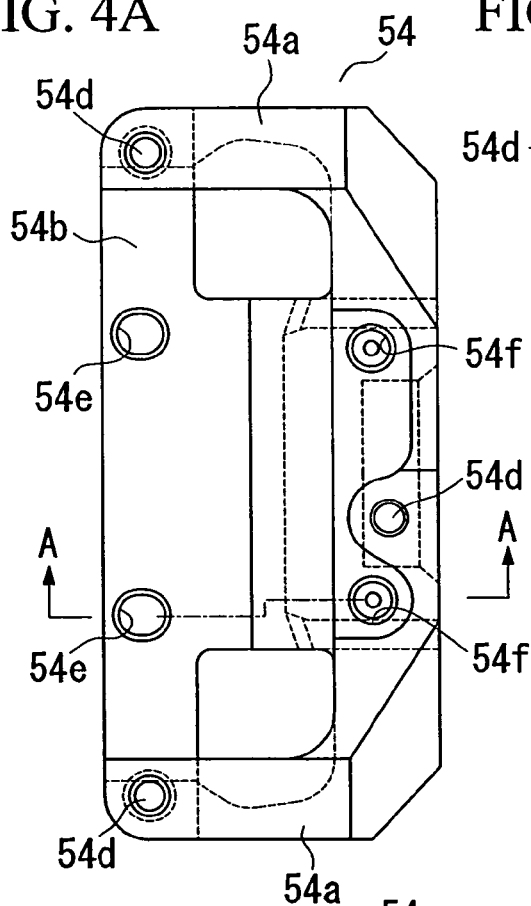
FIGS. 4A to 4C show a first bracket for steering damper mounting.
Figure 4B:
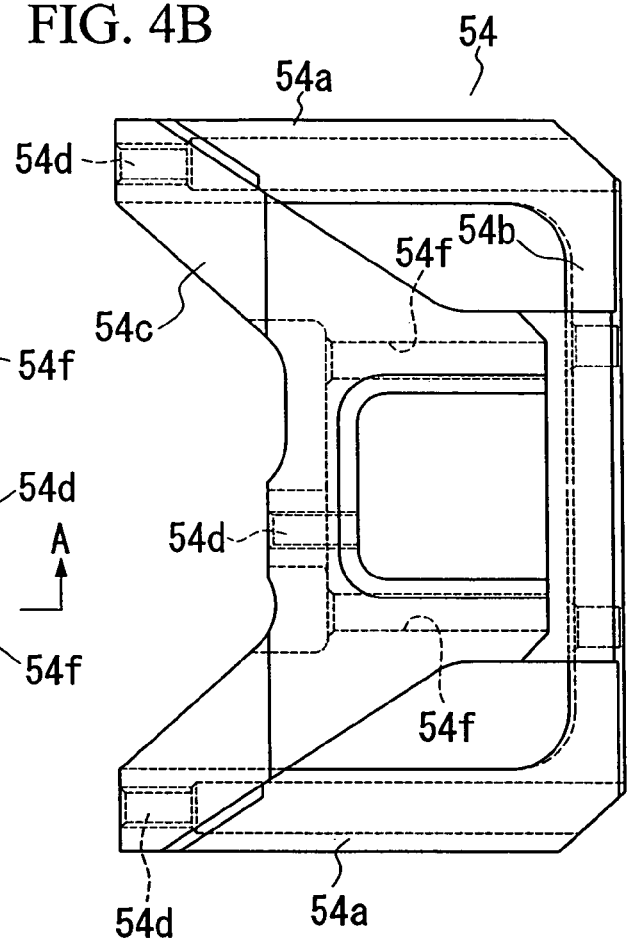
Figure 4C:
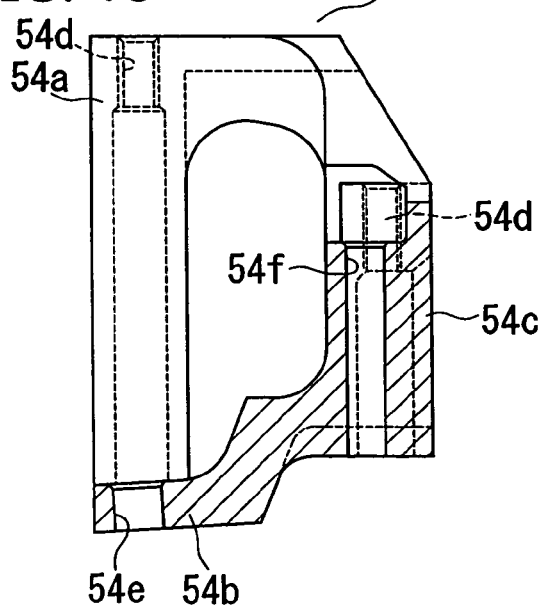

As shown in FIG. 4, the first bracket 54 has an approximately enclosed type shape wherein the inside is scooped out, and has right and left side wall sections 54a and 54a, a bottom plate section 54b, and a leg section 54c which has an approximately Y shape and is connected to rear edge sections of the side plate section 54a, and bottom plate section 54b. Then, respective mounting holes 54d, 54d, and 54d are formed in top face sections of the side wall sections 54a and 54a, and a top face section of the leg section 54c, and the above-mentioned steering damper 51 is bolted through the mounting holes 54d. In addition, mounting holes 54e and 54e are formed in the bottom plate section 54b, and mounting holes 54f and 54f are formed in the leg section 54c respectively, and the first bracket 54 is bolted to the junction 3a of the head pipe 3 through the mounting holes 54e.

Figure 5A:
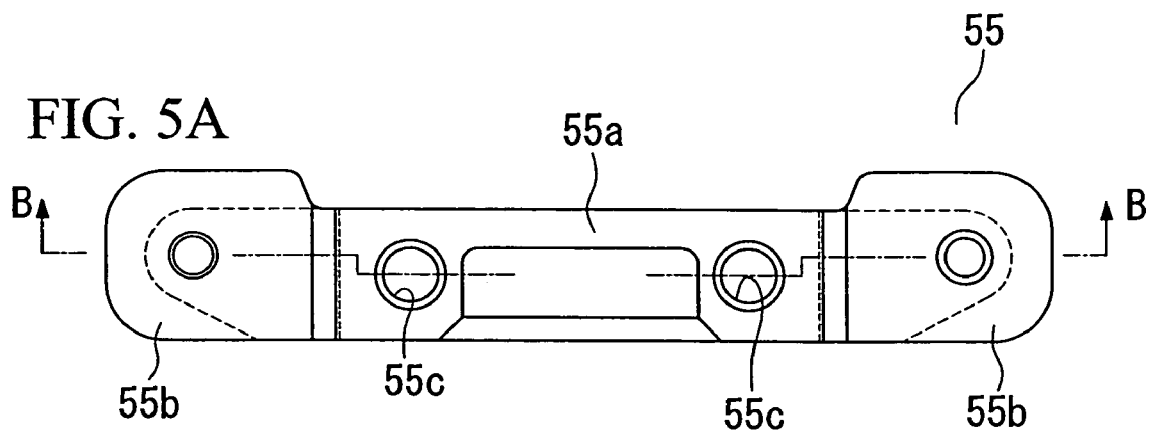
FIGS. 5A and 5B show a second bracket for steering damper mounting.
Figure 5B:
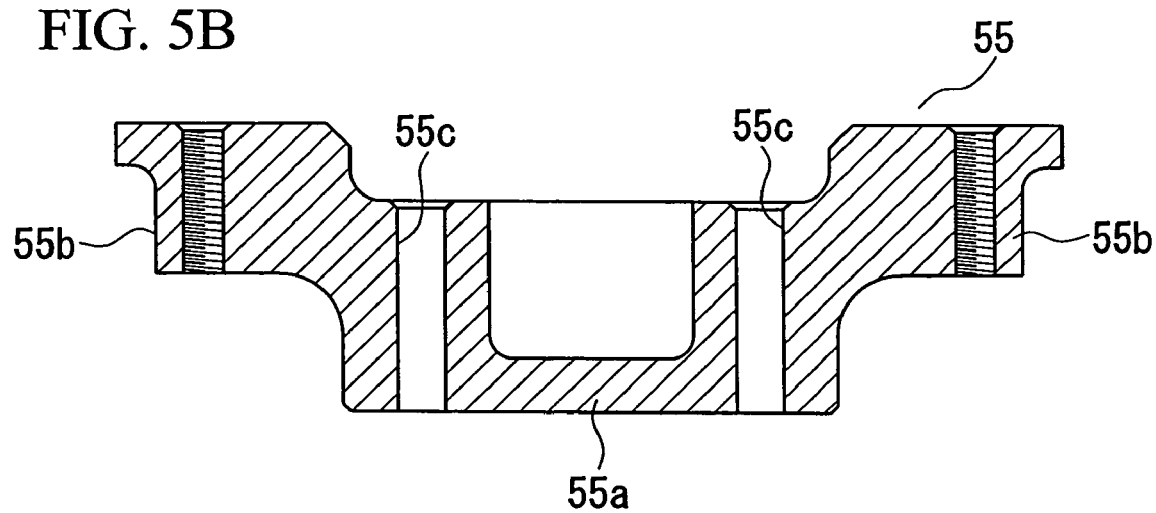

As shown in FIG. 5, the second bracket 55 has a base 55a formed in an approximately rectangular parallelepiped shape, and right and left overhang sections 55b and 55b protruding from both sides of the base upward. Mounting holes 55c and 55c are formed in the base 55a so as to be coaxial with the mounting holes 54f and 54f of the first bracket 54. Then, one bolt is inserted into the mounting holes 54f and 55c, both of which are coaxial, in the state that both the first bracket 54 and second bracket 55 are stacked. With the bolts, the second bracket 55 is attached to the junction 3a of the above-mentioned head pipe 3 with the first bracket 54.

Figure 3:
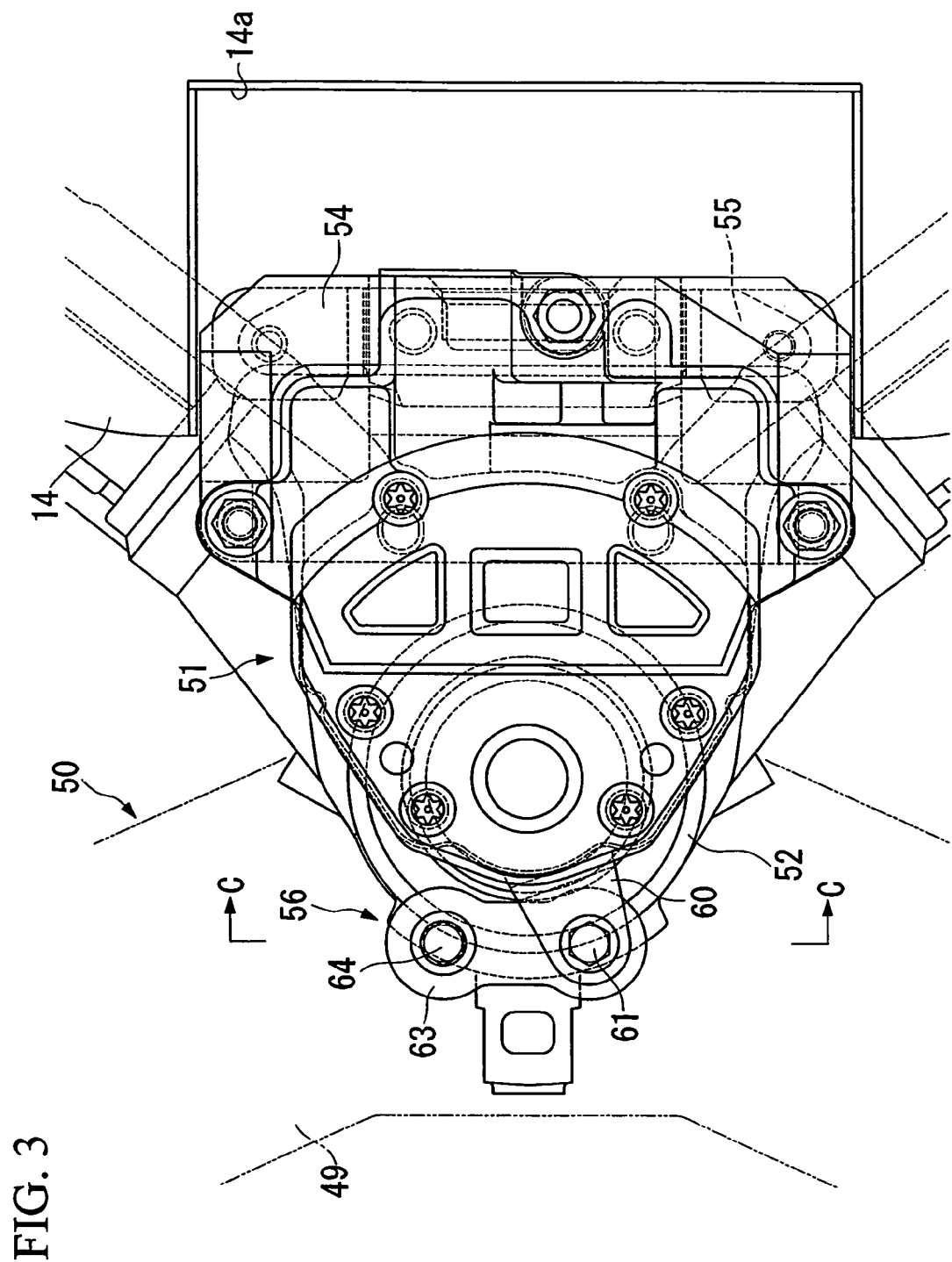
FIG. 3 is a plan view showing the mounting structure of the steering damper in the motorcycle.
Figure 6:
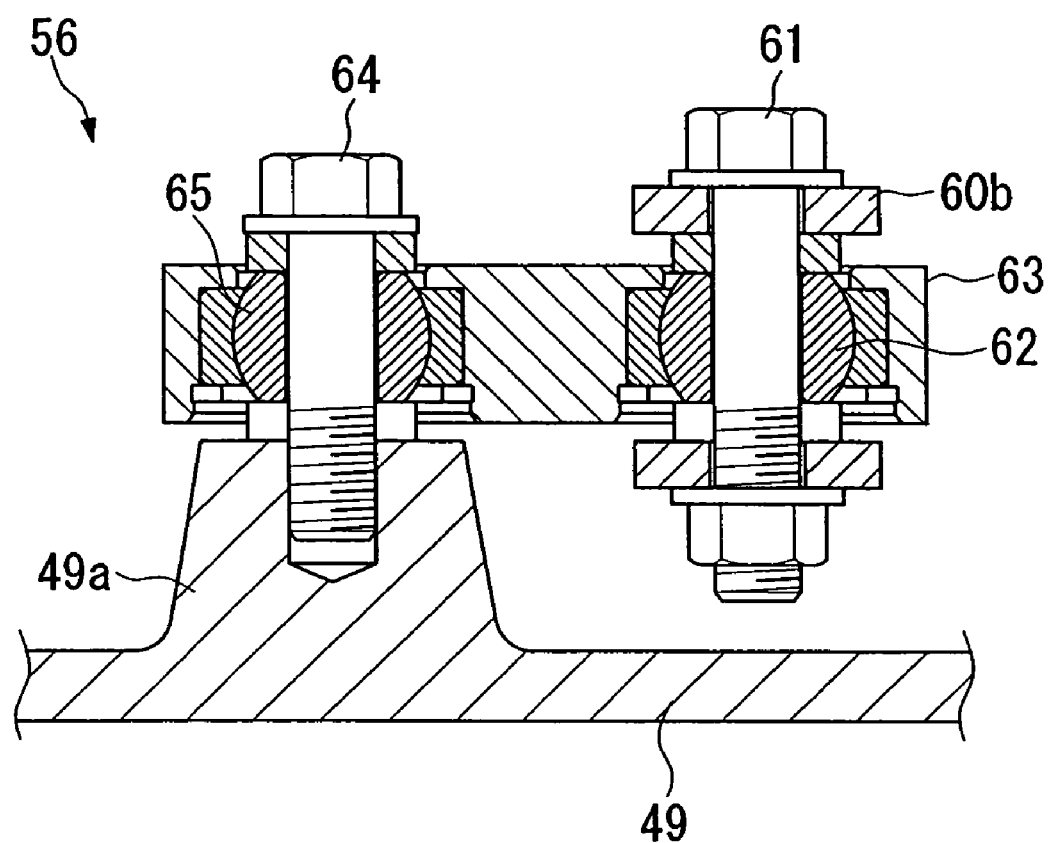
FIG. 6 is a cross-cross-sectional view taken along the line C-C in FIG. 3.
Figure 7:
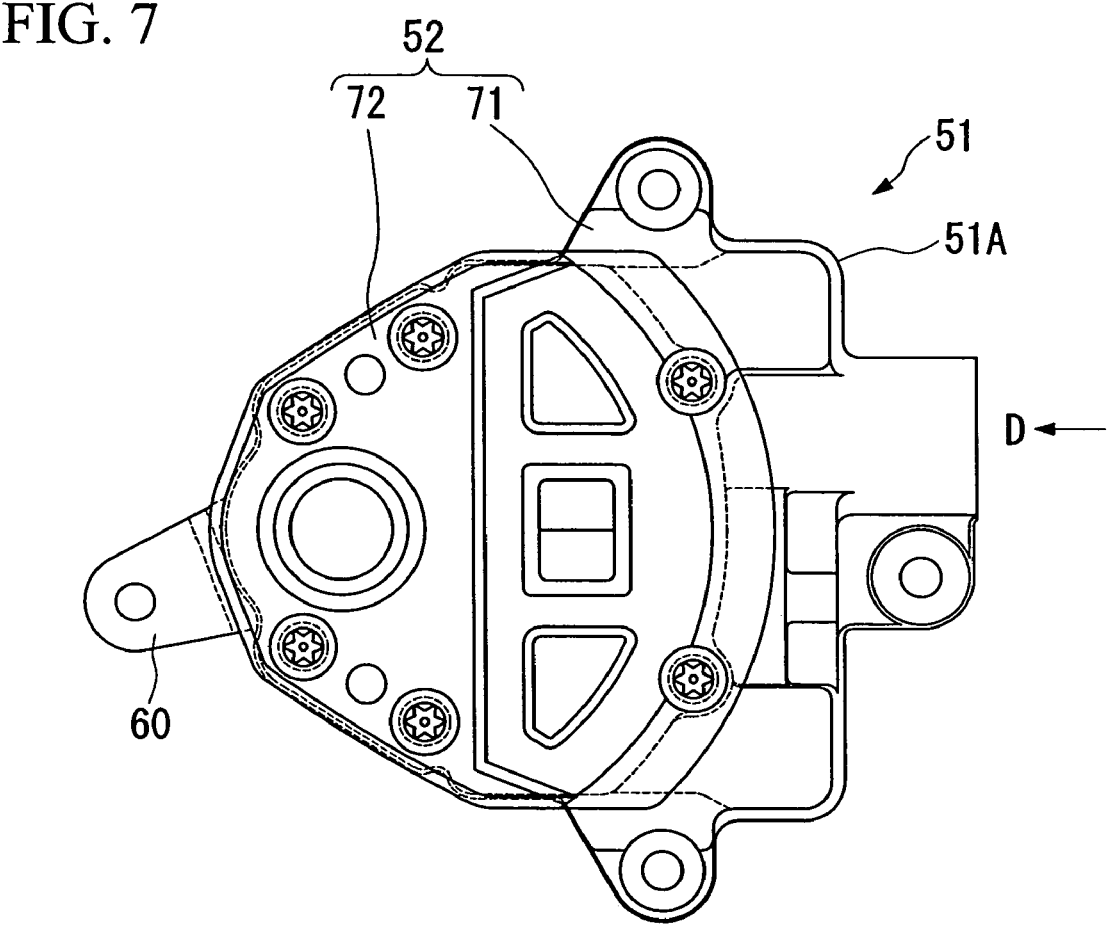
FIG. 7 is a plan view of a steering damper.
Figure 8:
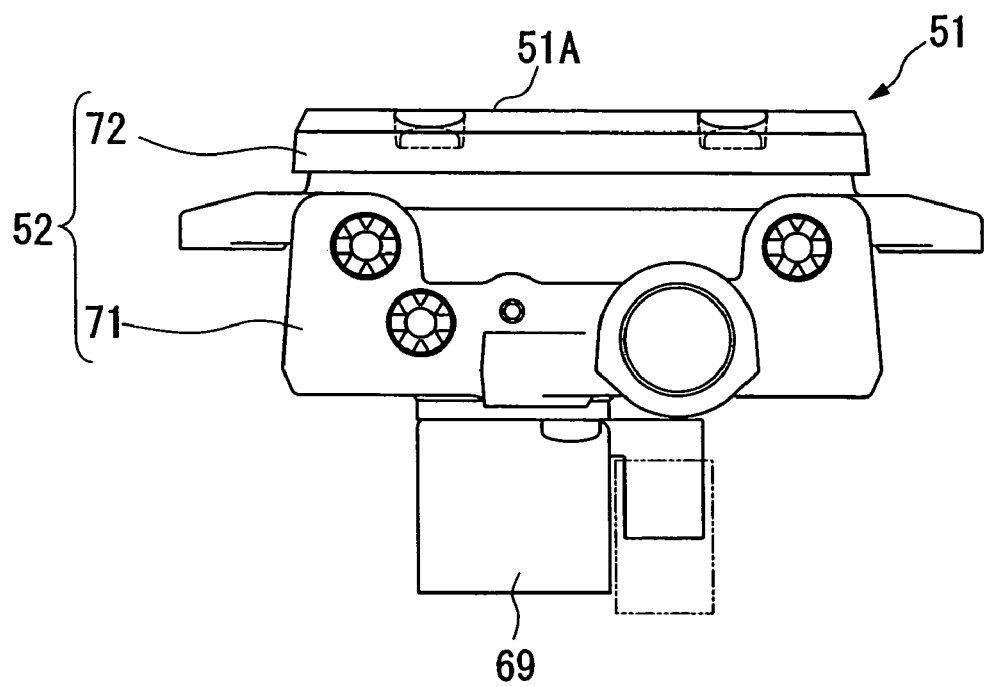
FIG. 8 is a view taken in the direction of the arrow D in FIG. 7.
Figure 9:
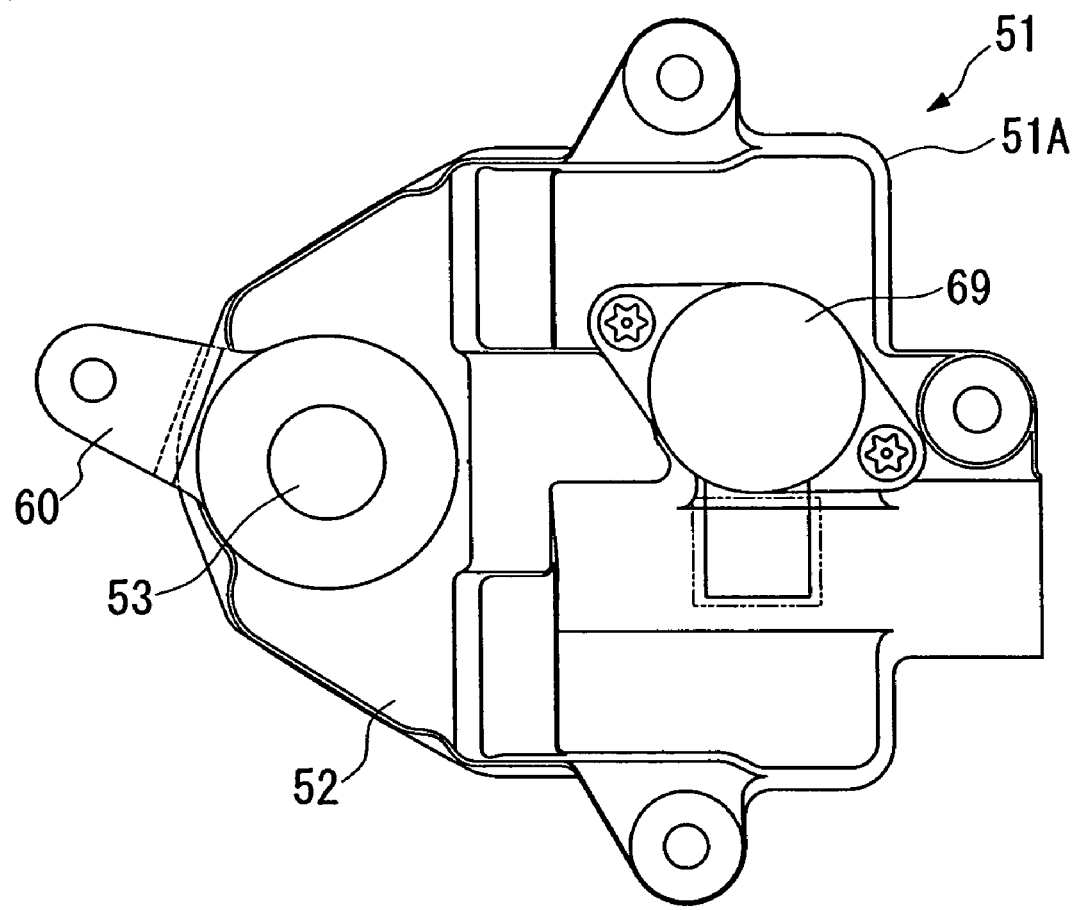
FIG. 9 is a bottom view of the steering damper.

As for the link mechanism 56, as shown in FIGS. 2, 3 and 6, an end section 60a of an arm 60 is attached to the shaft 53 which protrudes under the steering damper main body 51A. An end section of an elongated figure-8-shape linkage 63 is spherically supported by another end section 60b of the arm 60, which is branched into two, through a bolt 61, a ball member 62 fitted on the outer periphery of the bolt 61, and the like. In addition, another end section of the linkage 63 is spherically supported by a junction 49a, formed in the top bridge 49, trough a bolt 64 and a ball member 65 formed on the outer periphery of the bolt 64. That is, the link mechanism 56 which transmits a motion of the top bridge to the shaft 53 is constituted by the arm 60, bolts 61 and 64, ball members 62 and 65, and linkage 63.

Through the above-described first and second brackets 54 and 55, the housing 52 of the steering damper main body 51A is attached in the top bridge 49 so as to extend backward. Then, a linear solenoid 69 which drives and controls a pressure control valve 68 is located below an extruding section 52a extending from the top bridge 49 of the housing 52 backward.

In order to avoid interference with the steering damper 51 and the first and second brackets 54 and 55, a concavity 14a is formed in the front part of the fuel tank 14. In addition, in FIG. 2, reference numeral 70 denotes an ignition switch located ahead of the head pipe 3.

Figure 10:
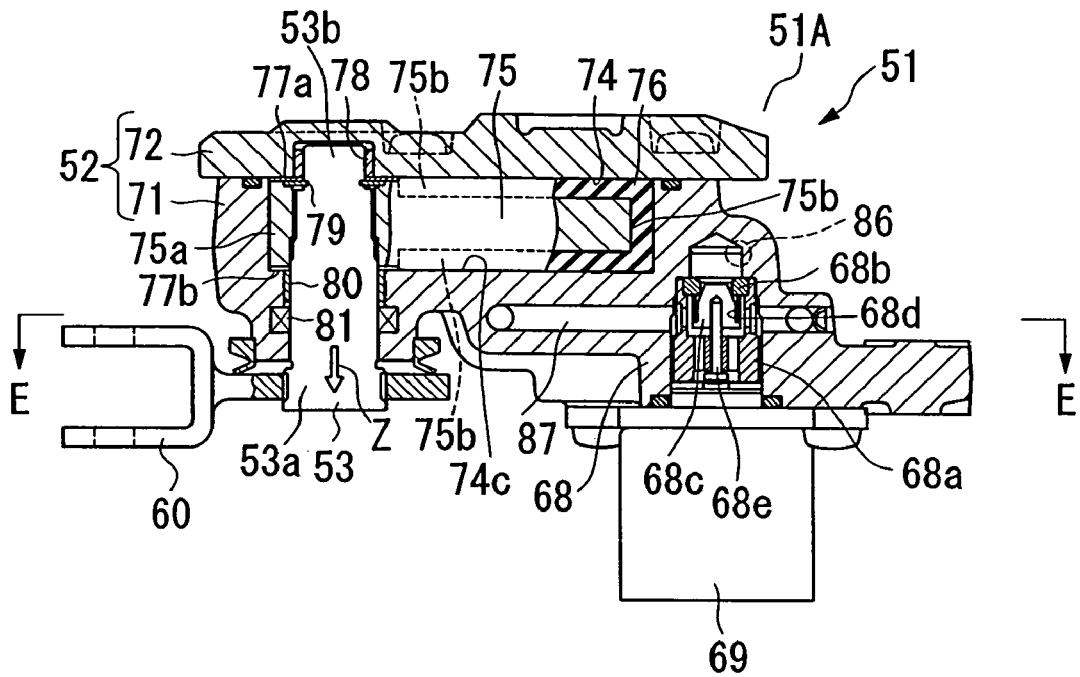
FIG. 10 is a cross-sectional view of the steering damper.

As shown in FIGS. 7 to 9 and FIG. 11, the housing 52 of the steering damper main body 51A is constituted by a body 71 and a cap 72. A fan-like concavity 73 is formed in a top face section of the body 71, and a fluid chamber 74 is formed by the concavity 73 being covered by the cap 72. The fluid chamber 74 is partitioned by a vane 75 into two, right and left, fluid chambers 74a and 74b. As shown in FIG. 10, a base 75a of the vane 75 is formed in a cylindrical shape, and the shaft 53 is joined with the cylindrical section in a fixed state so as to rotate integrally with the vane 75 through fixing means such as a spline. The vane 75 is supported by the shaft 53 in a rockable manner with respect to the housing 52.

A groove 75b is continuously formed on a top end, on a bottom end, and on a rear end of the vane 75, each of which faces the inner circumferential surface of the fluid chamber 74. In addition, a sealing member 76, which is formed in a U-shape so as to match the shape of the groove 75b, is fitted in the groove 75b. The groove 75b and sealing member 76 do not reach the shaft 53, but the groove 75b is formed, and the sealing member 76 is fitted in the groove 75b, up to points separated from the shaft 53.

As shown in FIG. 10, in the outer periphery of the shaft 53, washers 77a and 77b for sealing are fitted so as to abut against upper and lower face sections of the base 75a of the vane 75. Furthermore, portions of the outer peripheries of washers 77a and 77b for the sealing of upper and lower sides thereof abut against the sealing member 76. In other words, two fluid chambers 74a and 74b partitioned inside the housing 52 are maintained to be sealed from each other in a fluid-tight manner, and are also maintained to be sealed from the shaft 53 in a fluid-tight manner, by the sealing member 76 and washers 77a and 77b for sealing.

A bushing 78 is fitted on an upper part of an area where the washer 77a for the sealing of the shaft 53 is fitted, and a circlip 79 is fitted on a lower part of an area where the washer 77a for sealing is fitted, respectively. In addition, a bushing 80 and an oil seal 81 are fitted on a lower part of an area where the washer 77b for the sealing of the lower side of the shaft 53 is fitted, respectively.

Figure 11:
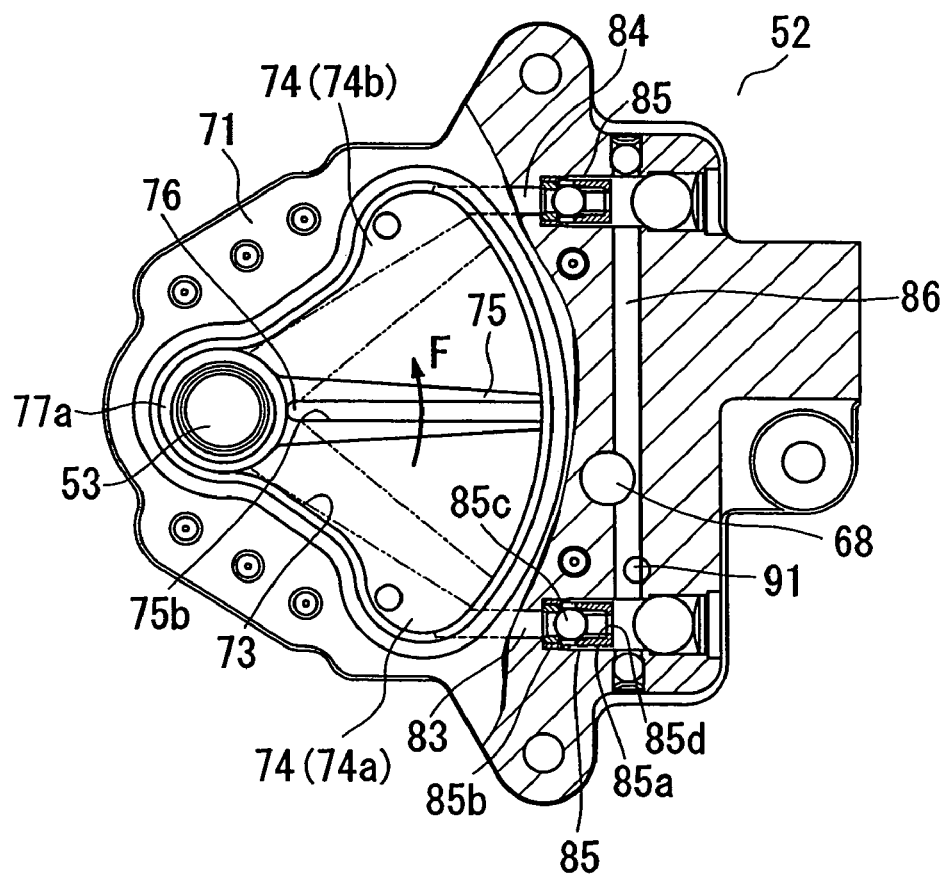
FIG. 11 is a partial cross-sectional plan view of a housing-body of the steering damper.
Figure 12:
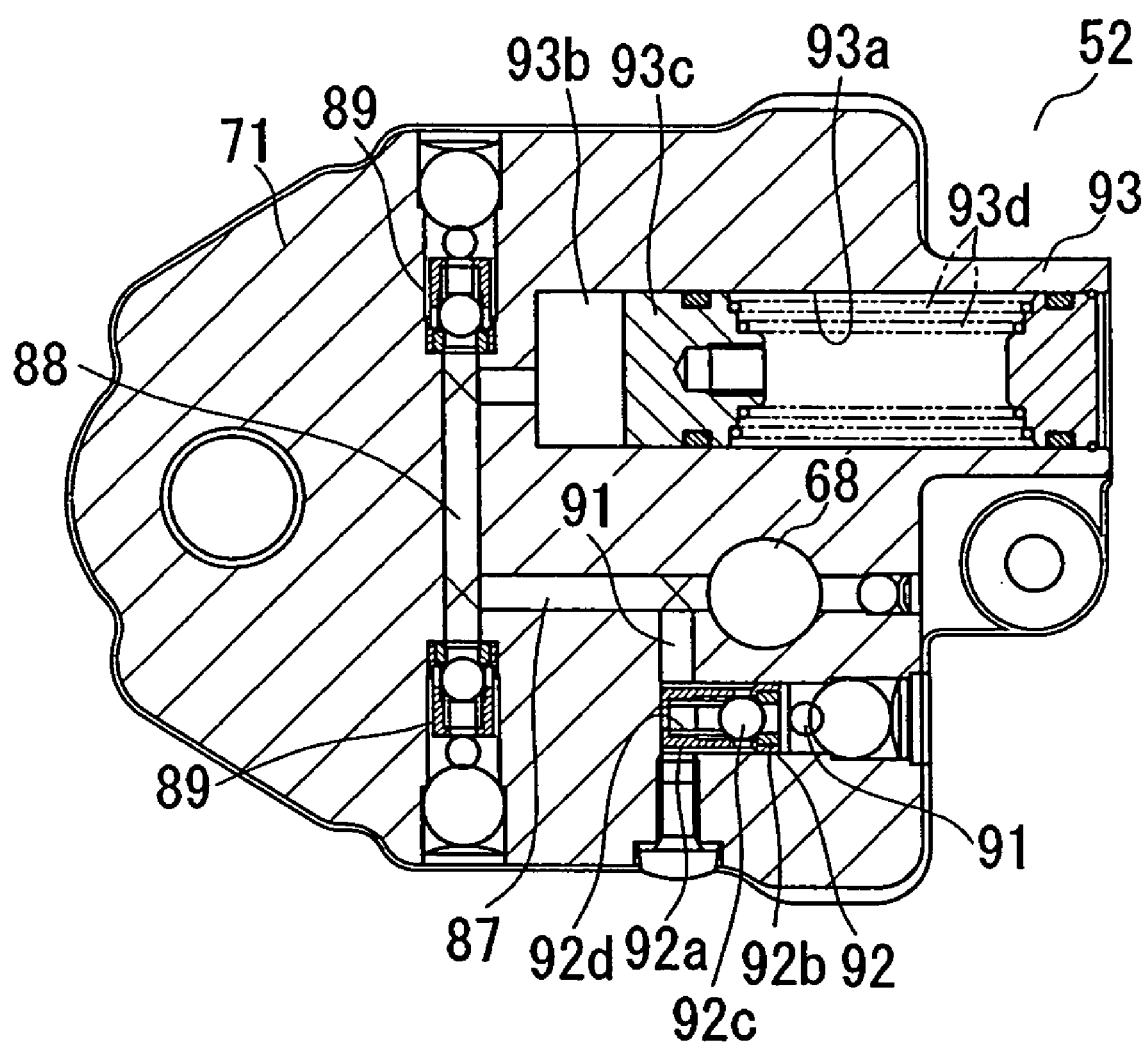
FIG. 12 is a cross-sectional view taken along the line E-E in FIG. 10.
Figure 13:
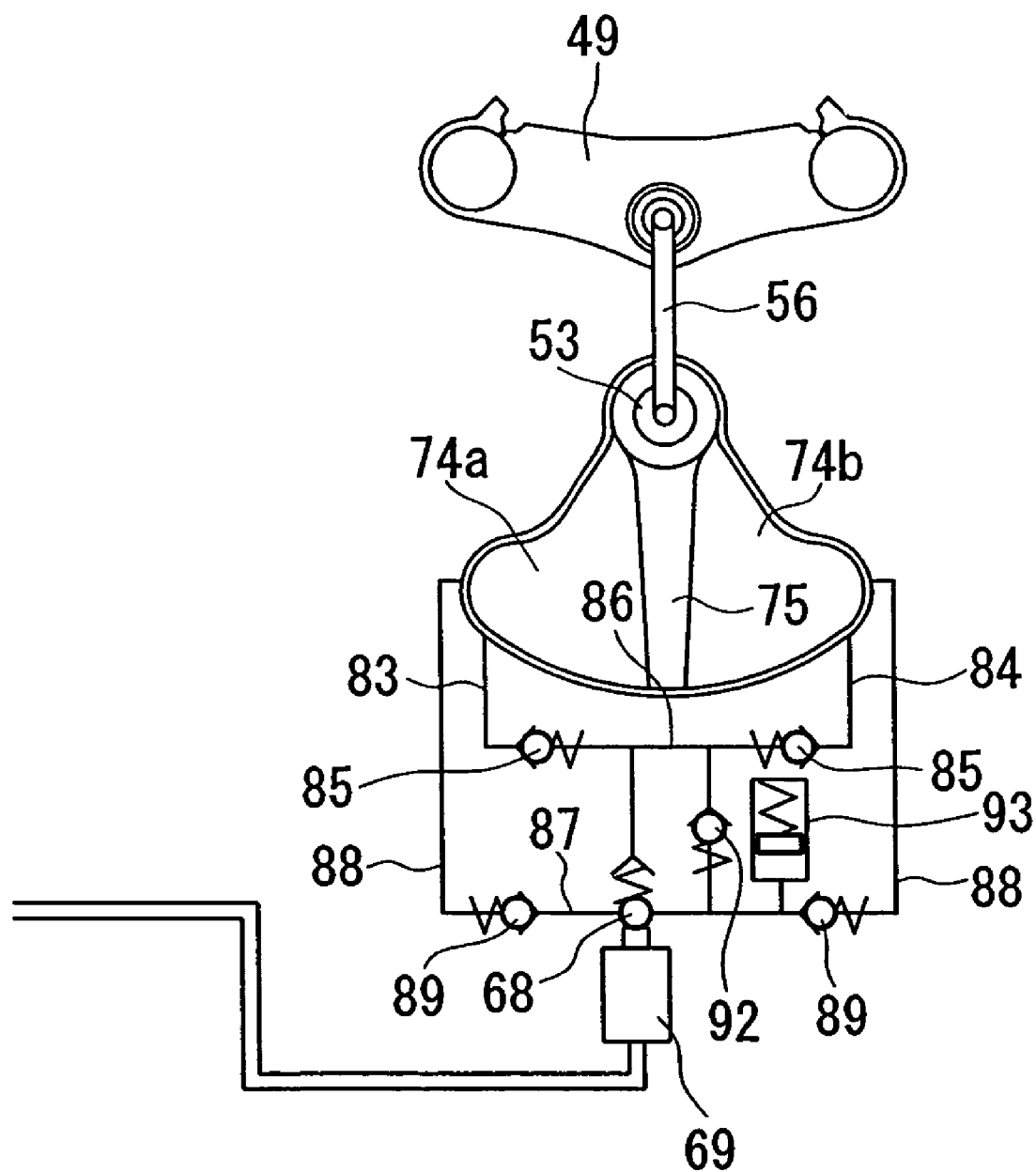
FIG. 13 is a schematic diagram of the steering damper.

As shown in FIGS. 10 to 12, the fluid paths 83 and 84 in a discharge side where hydraulic fluid is exhausted from the right and left fluid chambers 74a and 74b are formed in the body 71 of the above-mentioned housing 52 so that they extend back further from rear edges of inner circumferential surfaces of the fluid chambers 74a and 74b, and so that they are arranged substantially parallel to each other. Check valves 85 and 85 are intermediately installed in the fluid paths 83 and 84, respectively. Furthermore, the rear edge sections of the fluid paths 83 and 84 are formed so that a fluid path 86 which makes the fluid paths 83 and 84 communicate mutually may be approximately orthogonal to the fluid paths 83 and 84. The fluid path 86 is joined to a fluid path 87 in a lower side, extending so as to be substantially orthogonal to the fluid path 86, through the pressure control valve 68 located in the vertical direction (refer to FIG. 12). The fluid path 87 extends forward from an area in which the pressure control valve 68 is provided so as to reach under the fluid chamber 74, and communicates with the fluid path 88 whose front end is approximately orthogonal to the fluid path 87. Near both right and left end sections of the fluid path 88, check valves 89 and 89 are intermediately installed, respectively. After further extending to side edges of the body, both right and left ends of the fluid path 87 rise upward and communicate with the above-mentioned right and left fluid chambers 74a and 74b respectively. That is, the fluid path 88 acts as a fluid path in an entrance side to which the once exhausted hydraulic fluid is returned again to the fluid chambers 74a and 74b. In addition, the fluid path 87 where the above-mentioned electric pressure control valve 68 is intermediately installed becomes a connecting fluid path which makes the fluid paths in the entrance side and discharge side in view of the fluid chamber communicate. The fluid paths 83, 84, 86, 87, and 88 are formed in an upper portion and in a lower portion, i.e., two steps, of the body 7 of the housing 52.

Both the check valves 85 and 89 have the same structure. With explaining the check valve 85 as an example, in a valve body 85a, not only a valve seat 85b is provided, but also a ball 85c is contained. The ball 85c is suitably urged by a spring 85d so as to abut against the valve seat 85b. While allowing fluid to flow in the direction of separating the ball 85c from the valve seat 85b with resisting an urging force of the spring 85d, the check valve 85 prevents the flow of the fluid in the reverse direction. While allowing hydraulic fluid to flow toward the fluid path 86 through the fluid paths 83 and 84 from the fluid chambers 74a and 74b, the check valve 85 prevents the flow of the hydraulic fluid in the reverse direction. In addition, while allowing hydraulic fluid to return toward the fluid chambers 74a and 74b through the fluid path 88, the check valve 89 prevents the flow of the hydraulic fluid in the reverse direction.

As shown in FIG. 10, the pressure control valve 68 varies a damping force of the steering damper 51. As for the pressure control valve 68, not only is a valve seat 68b provided in a valve body 68a, but also a poppet 68c is contained so as to face the valve seat 68b. The poppet 68c is suitably urged by a spring 68d intermediately installed between a base spring seat of the poppet 68c, and the valve seat 68b so as to depart from the valve seat 68b. An upper end of a push rod 68e is inserted into a lower edge of the poppet 68c, and a lower edge of the push rod 68e is joined to the linear solenoid 69. Then, pressure adjustment is performed by the energizing operation of the linear solenoid 69 so that the poppet 68c may resist the urging force of the spring 68d for its head to abut against the valve seat 68c.

According to the pressure control valve 68, a location of the poppet 68c is settled by the differential pressure between the right and left fluid chambers 74a and 74b inside the housing 52 which communicate with spaces of its head and base, the urging force of the spring 68d, and an exciting force of the linear solenoid 69 through the push rod 68e. When a resultant force of the poppet thrust, based on the differential pressure between the right and left fluid chambers 74a and 74b, and the urging force of the spring 68d is weaker than the exciting force of the linear solenoid 69, the poppet 68c abuts on the valve seat 68b for the pressure control valve 68 concerned to be in a closed state. On the other hand, when the resultant force of the poppet thrust, based on the differential pressure between of the right and left fluid chambers 74a and 74b, and the urging force of the spring 68d exceeds the exciting force of the linear solenoid 69, the poppet 68c depart from the valve seat 68b for the pressure control valve 68 to be in an open state. Then, it is made that a predetermined damping force is obtained when hydraulic fluid passes through a gap between the valve seat 68b and poppet 68c of the pressure control valve 68.

In addition, the linear solenoid 69 is controlled by a controller, which is not illustrated, according to vehicle speed or vehicle body acceleration.

As shown in FIG. 12, a bypass fluid path 91 is formed between the fluid path 86 and fluid path 87, and a relief valve 92 is intermediately installed in the bypass fluid path 91. The relief valve 92 has the structure that not only a valve seat 92b is provided in a valve body 92a, but also a ball 92c is contained, the ball 92c which is energized toward the valve seat 92b with the suitable thrust by the spring 92d. Then, usually, although the ball 92c is abutting on the valve seat 92b, the relief valve 92 is moved and opens the valve by the ball 92c departing from a valve seat with resisting the urging force of the spring 92d by the thrust based on the differential pressure when the differential pressure between the fluid path 86 and fluid path 87 becomes a predetermined value or higher. Accordingly, the differential pressure between the fluid path 86 and fluid path 87 is relieved.

In addition, a free piston 93 communicates with the fluid path 88. The free piston 93 has the structure of including a cylinder 93a formed with the body 71 integrally, a piston 93c which partitions a reserving section 93b for reserving hydraulic fluid in a front part of the cylinder 93a, and a spring 93d which energizes the piston 93c toward the reserving section. Then, in the free piston 93, when the hydraulic fluid filled in a closed space which is constituted by the above-mentioned fluid chambers 74a and 74b, fluid paths 83, 84, and so on, make those fluid chambers communicate mutually which space expands or shrinks due to temperature change, the volume of the reserving section 93b changes because of the movement of the piston 93c to absorb the thermal expansion of the hydraulic fluid, etc.

Next, the operations of the steering damper having the above-mentioned structure will be explained below.

When a main switch of the vehicle is turned ON, the controller which controls the steering damper 51 starts. The linear solenoid 69 which controls the hydraulic control valve 68 of the steering damper 51 is controlled according to the vehicle speed and vehicle body acceleration which are determined by sensors, not shown, respectively.

When the steering handle 21 is turned to the left during driving, the top bridge 49 rotates in this direction integrally with the steering handle 21, and the motion of the top bridge 49 is transmitted to the shaft 53 of the steering damper main body 51A through the link mechanism 56. As shown in FIG. 11. when the shaft 53 rotates counterclockwise, the vane 75 also rotates in this direction therewith (F direction in FIG. 11). In connection with this, while the pressure of the hydraulic fluid, which is filled in the fluid chamber 74b, increases, since the fluid chamber 74b becomes narrow, the hydraulic fluid in the fluid chamber 74b directly moves to the fluid chamber 74a in another side through a gap between the vane 75 and inner circumferential surface which partitions the fluid chamber 74, and to like (indicated by symbol (a) in FIG. 14). When the pressure of the hydraulic fluid in the fluid chamber 74b, which becomes narrow, increase still further although some hydraulic fluid directly moves to the fluid chamber 74a front the fluid chamber 74b, the hydraulic fluid reaches the fluid path 86 through the fluid path 84 and check valve 85, and tries to reach the pressure control valve 68 therefrom.

Because the poppet 68c usually abuts against the valve seat 68b by the exciting force of the linear solenoid 69, the pressure control valve 68 is closed. Accordingly, even if some hydraulic fluid pressure is applied from the fluid chamber 74b, the pressure control valve 68 is maintained in the closed state. Because the thrust based on the differential pressure between the right and left fluid chambers 74a and 74b increases gradually with the rise of the steering angular velocity of the steering handle 21, the resultant force of the thrust and urging force of the spring 68d may exceed the exciting force of the linear solenoid 69. In this case, the poppet 68c departs from a valve seat 68b, and hence, the pressure control valve 68 moves to the open state (this point is indicated by each symbol (b) in FIG. 14). Then, through the pressure control valve 68 which moves to the open state, the hydraulic fluid in the fluid path 86 passes along a gap between the valve seat 68b of the pressure control valve 68 and the poppet 68c, and reaches the fluid path 87. Furthermore, it reaches therefrom to the left fluid chamber 74a through the fluid path 88 and check valve 89 (indicated by each symbol (c) in FIG. 14). That is, the hydraulic fluid flows into the fluid chamber 74a continuously from the fluid chamber 74b through the pressure control valve 68 which moves to the open state.

The flow resistance of the hydraulic fluid which flows into the fluid chamber 74a from the fluid chamber 74b generates a damping force which acts on the steering handle 21. In other words, the flow resistance of the hydraulic fluid acts as a resistance force when turning the steering handle 21, and acts as a resistance force to the momentary turning force acting on the steering handle.

Figure 14:
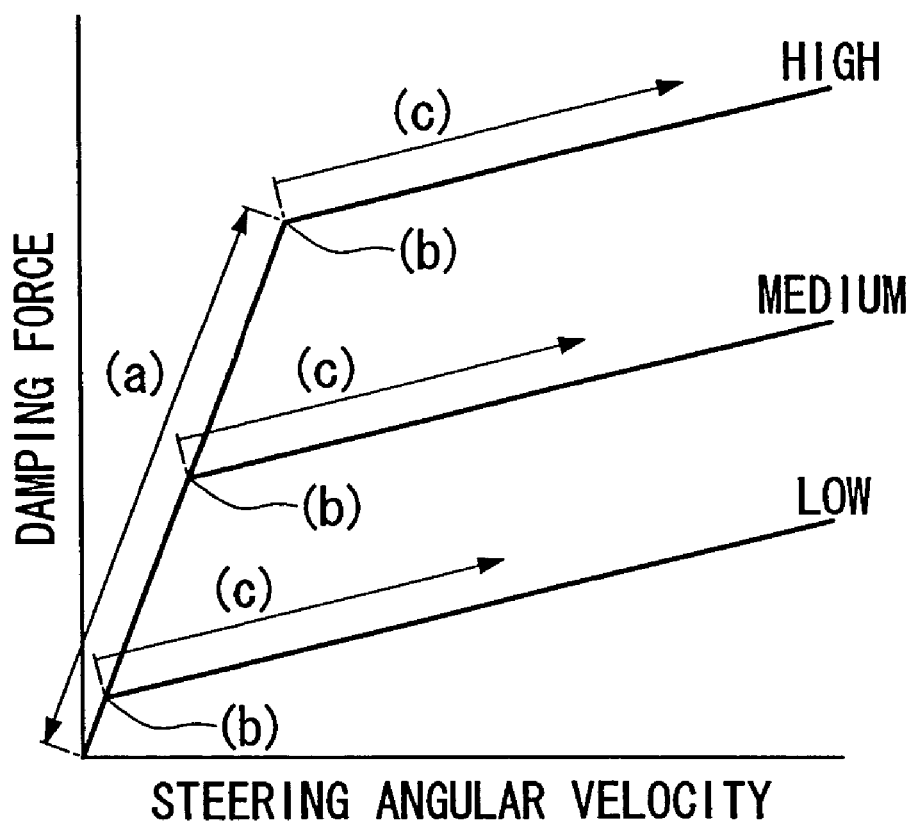
FIG. 14 is a graph showing the characteristics of the steering damper.

In the example shown in FIG. 14, three typical cases are shown, in which electrical current supplied to the linear solenoid 69 is set at three typical points, i.e., at high, medium, and low. In these cases, the damping force has an increasing rate with respect to the steering angular velocity after the pressure control valve 68 once moves to the open state and is set to be low when compared with the case in which the pressure control valve 68 is in the closed state, even though the damping forces when the pressure control valve 68 is in the open state change depending on electrical current values.

More specifically, with each of the positions indicated by symbols (b) in FIG. 14 as a boundary point, the increasing rate of the damping force with respect to the steering angular velocity becomes smaller at a large steering angular velocity than at a small steering angular velocity, or at a large damping force than at a low damping force (i.e., the slope of line (c) in FIG. 14 becomes less than the slope of line (a)).

This can be explained as follows. Since the hydraulic fluid flows through a very narrow gap between the vane 75 and inner circumferential surface which partitions the fluid chamber 74, or the like until the pressure control valve 68 opens when the hydraulic fluid flows from one fluid chamber 74b to another fluid chamber 74a, flow resistance is relatively large. Nevertheless, since the flow resistance becomes small because the hydraulic fluid mainly flows through the passage of the open pressure control valve 68 after the pressure control valve 68 is opened, this emerges as the increasing rate of the damping force with respect to the steering angular velocity.

In consequence, it is possible to quickly increase the damping force as the steering angular velocity becomes large even if the damping force is small when the steering angular velocity is small. Accordingly, it is possible to concurrently solve two problems of making the starting torque of the steering handle 21 small and absorbing the vibration in the low steering angular velocity region which is caused by road surface disturbances during medium speed driving or high speed driving. In addition, because the increasing rate of the damping force is set to be low when the steering angular velocity exceeds each of positions (b) as the boundary point, it is possible to prevent the damping force from exceeding a predetermined value. Accordingly, it is possible to prevent the effort of handling from becoming too great beyond a predetermined value.

In addition, as described above, the linear solenoid 69 is controlled depending on the vehicle speed. More specifically, the upper limit of the current supplied to the linear solenoid 69 is controlled so as to be high as vehicle speed is increased. Hence, for example, at a high-speed region, the timing when the pressure control valve 68 enters in the open state (each symbol (b) in FIG. 14) is delayed, and furthermore, a larger damping force is exhibited by an increased amount of the exciting force even after entering in the open state. That is, when vehicle speed reaches a high-speed region, a damping force larger than that in a low speed region or a medium speed region is exhibited. Accordingly, since handling ability is considered to be important at low speed driving, it is possible to turn the steering handle 21 with a relatively small force. On the other hand, since a high damping force acts when turning the steering handle 21 during high speed driving, it is possible to further absorb the vibrations in a low steering angular velocity region which is caused by road surface disturbances during high speed driving.

Although in the above description, the case in which the steering handle 21 is turned to the left is explained; however, the same description applies to the case in which the steering handle 21 is turned to the right.

In addition, the hydraulic fluid pressure in one of the right and left fluid chambers 74a and 74b is increased due to some causes during the control operation of the above-mentioned steering damper 51, and thus the differential pressure of the hydraulic fluid between the upstream and downstream of the pressure control valve 68 may become larger than a preset value, the excessively large differential pressure between them is relieved by opening the relief valve 92 so as to allow the hydraulic fluid in the fluid path 86 to flow to the fluid path 87 through the bypass fluid path 91. In this manner, the hydraulic fluid pressure of the one fluid chamber becoming excessively high is prevented beforehand.

In addition, when the temperature of the hydraulic fluid filled in the fluid chamber 74 and fluid paths 83, 84, and so on, changes, and hence, the hydraulic fluid expands or shrinks, the volume change of the hydraulic fluid is absorbed since the piston 93c of the free piston 93 moves inside the cylinder 93a according to it.

While preferred embodiments of the invention have been described and illustrated above, it should be understood that these are exemplary of the invention and are not to be considered as limiting. Additions, omissions, substitutions, and other modifications can be made without departing from the spirit or scope of the present invention.

For example, in the above-mentioned embodiment, the current value supplied to the linear solenoid 69 is controlled steplessly according to the vehicle speed and vehicle body acceleration (in addition, FIG. 14 shows only three typical cases, that is, high, medium, and low current for the convenience of expression). The present invention is not limited to this, and can be applied to a configuration in which the supply current value to the linear solenoid 69 is controlled stepwise.

Moreover, in the above-mentioned embodiment, the damping force of the steering damper 51 changes through the pressure control valve 68 controlled by the linear solenoid 69. The present invention is not limited to this, and it is also possible for the relationship between the steering angular velocity and the damping force of the steering system to not be linear over the entire steering angular velocity region by the relief valve 92 provided in the fluid path communicating with the fluid path 88 in an entrance side to the fluid chamber 74 of the steering damper main body 51A, and fluid paths 83 and 84 in a discharge side, and an increasing rate of the damping force with respect to the steering angular velocity being set so as to be smaller at a large steering angular velocity than at a small steering angular velocity, or at a large damping force than at a small damping force.

As mentioned above in detail, according to the steering damper of the present invention, the relationship between the steering angular velocity and the damping force of the steering system is not linear in a full steering angular velocity region. However, the steering damper is set so that an increasing rate of the damping force with respect to the steering angular velocity of the steering system may become smaller at a large steering angular velocity than at a small steering angular velocity, or at a large damping force than at a small damping force. Hence, it is possible to quickly increase the damping force as the steering angular velocity becomes large even if the damping force is small when the steering angular velocity is small. Owing to this, it is possible to concurrently solve two problems of making the starting torque of a steering handle small and absorbing the vibration in the low steering angular velocity region which is caused by road surface disturbance during high speed driving. In addition, since the increasing rate of the damping force becomes gentle even if the steering angular velocity becomes large after that, it is possible to prevent the damping force from rising to a predetermined value or larger.

The invention is not to be considered as being limited by the foregoing description, and is only limited by the scope of the appended claims.

What is claimed is:

1. A steering damper comprising:
 a steering damper body installed in a steering system of a vehicle, and having a fluid path therein;
 a pressure control valve for controlling a damping force in the steering system, and provided in the fluid path; and means for controlling the damping force with the pressure control valve so that an increasing rate of the damping force with respect to a steering angular velocity when the steering angular velocity is larger than a predetermined value is lower than that when the steering angular velocity is smaller than or equal to the predetermined value, wherein the increasing rate of the damping force in a range of the steering angular velocity from zero to the predetermined value is greater than that in a range of the steering angular velocity greater than the predetermined value.

2. A steering damper according to claim 1, wherein the steering damper body comprises a fluid chamber having an entrance and an exit, a first fluid path connected to the entrance of the fluid chamber, a second fluid path connected to the exit of the fluid chamber, and a connection fluid path connecting the first fluid path to the second fluid path; and wherein the pressure control valve is a relief valve provided in the connection fluid path.

3. A steering damper comprising:

a steering damper body installed in a steering system of a vehicle, and having a fluid path therein;

a pressure control valve for controlling a damping force in the steering system, and provided in the fluid path; and means for controlling the damping force with the pressure control valve so that an increasing rate of the damping force with respect to a steering angular velocity when the damping force is larger than a predetermined value is lower than that when the damping force is smaller than or equal to the predetermined value, wherein the increasing rate of the damping force in a range of the damping force from zero to the predetermined value is greater than that in a range of the damping force greater than the predetermined value.

4. A steering damper according to claim 3, wherein the steering damper body comprises a fluid chamber having an entrance and an exit, a first fluid path connected to the entrance of the fluid chamber, a second fluid path connected to the exit of the fluid chamber, and a connection fluid path connecting the first fluid path to the second fluid path, and wherein the pressure control valve is a relief valve provided in the connection fluid path.

5. A steering damper comprising:

a steering damper body installed in a steering system of a vehicle, and having a fluid path therein;

a pressure control valve for controlling a damping force in the steering system, and provided in the fluid path; and means for controlling the damping force with the pressure control valve so that an increasing rate of the damping force with respect to a steering angular velocity when the steering angular velocity is larger than a predetermined value is lower than that when the steering angular velocity is smaller than or equal to the predetermined value, wherein the increasing rate of the damping force in a range of the damping force from zero to the predetermined value is greater than that in a range of the damping force greater than the predetermined value.

6. A steering damper comprising:

a steering damper body installed in a steering system of a vehicle, and having a fluid path therein;

a pressure control valve for controlling a damping force in the steering system, and provided in the fluid path; and means for controlling the damping force with the pressure control valve so that an increasing rate of the damping force with respect to a steering angular velocity when the damping force is larger than a predetermined value is lower than that when the damping force is smaller than or equal to the predetermined value, wherein the damping force linearly increases in a range of the damping force from zero to the predetermined value and in a range of the damping force greater than the predetermined value.

* * * * *